United States Patent [19]

Conner

[11] 4,157,700

[45] Jun. 12, 1979

[54] PRE-VAPORIZATION SYSTEM

[76] Inventor: George E. Conner, 5559 Holly Springs, Houston, Tex. 77027

[21] Appl. No.: 825,821

[22] Filed: Aug. 18, 1977

[51] Int. Cl.² ........................................... F02M 31/00
[52] U.S. Cl. ........................... 123/122 E; 123/122 F; 123/119 E; 261/142
[58] Field of Search ................ 261/142; 219/206, 207; 123/119 E, 148 A, 122 E, 122 F

[56] References Cited

U.S. PATENT DOCUMENTS

| | | | |
|---|---|---|---|
| 1,530,882 | 3/1925 | Chapin | 123/122 E |
| 3,472,214 | 10/1969 | Moon | 123/122 E |
| 3,738,334 | 6/1973 | Fan | 123/122 E |
| 4,064,852 | 12/1977 | Fulenwider, Jr. | 123/122 F |

*Primary Examiner*—Ronald H. Lazarus
*Attorney, Agent, or Firm*—Browning, Bushman & Zamecki

[57] ABSTRACT

A fuel pre-vaporization system for an internal combustion engine comprising a fuel vaporization chamber having a fuel inlet and a vapor outlet. The system further comprises a magnetron for generating microwaves and a microwave absorbing heat transfer medium exposed to the magnetron output and associated with the vaporization chamber in heat communicating relation with the interior of said chamber. A vapor transfer chamber is provided in communication with the vapor outlet of the vaporization chamber for transmitting vapor from the vaporization chamber to the engine.

14 Claims, 2 Drawing Figures

4,157,700

PRE-VAPORIZATION SYSTEM

BACKGROUND OF THE INVENTION

1. Field of the Invention

The present invention relates to the pre-vaporization of fuel for internal combustion engines. In a conventional engine, air and fuel in the form of vapor, and in a suitable ratio, are passed into the cylinders of the engine. Heat for the vaporization of this fuel is traditionally provided by the engine itself. For example, in an ordinary gasoline engine, the intake manifold is disposed adjacent the exhaust manifold so that heat from the latter will cause vaporization of the fuel in the former before it reaches the cylinders.

As is well known in the art, the more complete the vaporization of the fuel, the greater the effeciency of the engine. In conventional engines, however, complete, uniform vaporization is rare. The consequence is incomplete combustion of the fuel resulting in low efficiency and a relatively high amount of pollutants. In an effort to combat this problem, additives are often mixed with the fuel to increase its efficiency. However, such additives cause the production of even more pollutants.

2. Description of the Prior Art

Several prior art systems have been proposed for pre-vaporization of the fuel prior to its entry into the intake manifold of an engine in order to provide for more complete combustion of the fuel. For example, U.S. Pat. No. 3,498,279 to Seeley teaches passing raw gasoline over a hot surface prior to introduction into the carburetor of a standard internal combustion engine or the cylinder of a diesel engine. The surface is heated either by an electrically operated heater or a gas heated countercurrent exchanger employing the hot gaseous products of combustion. U.S. Pat. No. 3,952,716 to McCauley discloses a system in which a fuel/air mixture is oscillated by means of a rotor, subjected to sonic vibration and then passed through a heated grid or screen to promote vaporization. U.S. Pat. No. 3,973,543 to Nakada discloses a system for promoting vaporization of fuel within the intake manifold of an engine by means of an intensive electric field.

None of the above systems, however, have been entirely satisfactory. For example, various ones of them are too slow in heating and vaporizing the fuel, too complicated, and/or tend to produce waste products of their own.

SUMMARY OF THE INVENTION

Accordingly there is need for a simple, clean system for rapidly pre-vaporizing fuel for an internal combustion engine to promote maximum combustion of such fuel. Such a system is currently particularly desirable in view of the concern for conservation of fossil fuels as well as reduction of the pollution resulting from their combustion. The achievement of the two latter goals often conflict with each other in that measures designed to decrease pollution may result in a lowering of fuel efficiency and vice versa. However, the present invention, by promoting as complete a combustion of fossil fuel as possible, simultaneously increases the efficiency of the fuel burning engine and reduces its polluting waste products. Furthermore, the present invention achieves these effects without the use of polluting fuel additives through a system which is in itself virtually free of pollutant waste products and capable of extremely rapid vaporization of the fuel.

In particular, the present invention provides a pre-vaporization chamber having an inlet for the introduction of fuel and an outlet for the exit of fuel vapor. The vaporization of the fuel within this chamber is ultimately achieved by microwave energy. However, since common hydrocarbon fuels such as gasoline and diesel fuel do not appreciably absorb microwaves, a microwave absorbing heat transfer means is provided. This heat transfer means is exposed to the output of a magnetron or such microwave generating means and associated with the vaporization chamber in heat communication relation with the interior of the chamber and thus with the fuel therein. A vapor transfer means is communicatively connected to the vapor outlet of the chamber for transmitting from the vaporization chamber to the engine, e.g. to the intake manifold of an ordinary engine.

In the preferred forms of the invention, the heat transfer means comprises a liquid heat transfer medium contained within microwave transparent walls, the latter forming heat transfer surfaces within the vaporization chamber for contact with the fuel. The magnetron output is then communicated to the interior of the chamber. The liquid heat transfer medium preferably has a high boiling temperature relative to the fuel such that it will remain in liquid state during operation of the system.

The system also preferably includes one fuel pump for propelling fuel through the vaporization chamber and another fuel pump for propelling the fuel through an auxiliary fuel supply means to the engine bypassing the vaporization chamber. The latter pump is operative during starting and initial operation of the engine. However, the aforementioned magnetron is powered by a suitable power source conveniently driven by the engine. Once sufficient heating and vaporization has begun in the vaporization chamber, a pressure sensor within the chamber will deactivate the pump for the auxiliary fuel supply means and activate the pump for the vaporization chamber.

By means of the present system, virtually complete vaporization of the fuel is achieved. Thus more complete combustion and increased efficiency result. Furthermore, in conventional internal combustion engines, the non-uniformity of vaporization is a limiting factor on the compression ratio of the engine. In other words, the compression ratio must ordinarily be relatively low in order to prevent prefiring of the cylinders due to the non-uniformity of the fuel/air mixture from one cylinder to the next. With the more complete vaporization achieved by the present invention, a higher compression ratio could be used thereby further increasing the engine efficiency.

Accordingly, it is a principal object of the present invention to provide an improved pre-vaporization system for an internal combustion engine.

Another object of the invention is to provide a pre-vaporization system which makes use of microwave energy in the vaporization process.

Still another object of the invention is to provide an extremely rapid and clean means of pre-vaporizing fuel for internal combustion engines.

Yet a further object of the invention is to increase the efficiency and decrease the polluting effects of internal combustion engines.

Still other objects, features, and advantages of the invention will be made apparent by the following description of the preferred embodiment, the drawing and the claims.

DESCRIPTION OF THE PREFERRED EMBODIMENTS

Figure 1:
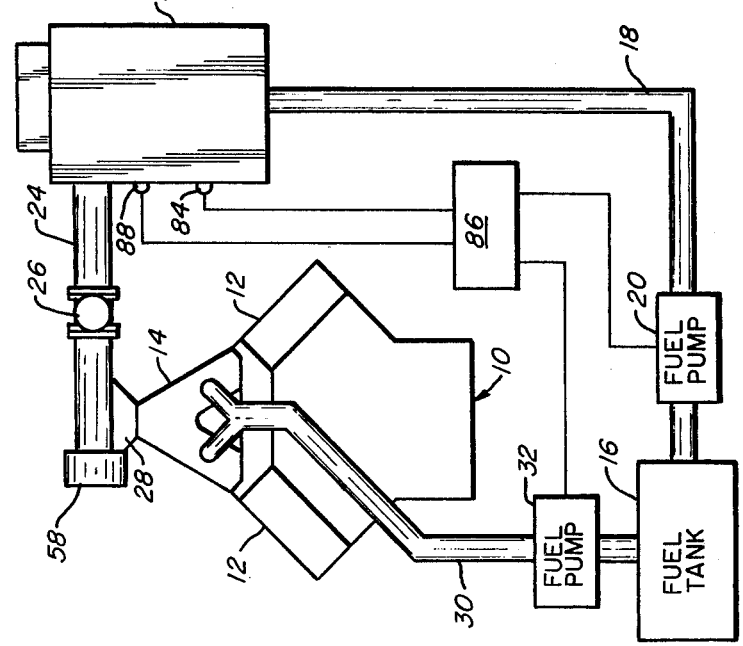
FIG. 1 is a diagram of a pre-vaporization system according to the present invention.

FIG. 1 shows a pre-vaporization system adapted for an otherwise typical gasoline engine 10. The engine 10, which is shown schematically, includes an intake manifold 14 and a number of cylinders, two of which are indicated at 12, communicating with the manifold 14 in the conventional manner. Gasoline from a fuel tank 16 may be directed into the intake manifold 14 via two different routes. In the main fuel route the gasoline is pumped from tank 16 through a fuel line 18 by a pump 20 disposed in line 18 and thence into a vaporization chamber 22. The gasoline is vaporized in chamber 22 in a manner to be described more fully below. The resulting vapor exits the chamber 22 through a vapor transfer means including a line 24, containing a pressure regulator 26, and a mixing chamber 28, which in turn communicates with the manifold 14. The main fuel route is functional during ordinary running of the engine. However, for starting and initial running of the engine, an auxiliary route is provided including a line 30 leading from the fuel tank 16 directly into the manifold 14 and bypassing the vaporization chamber 22. A separate fuel pump 32 is provided in line 30 for the auxiliary fuel supply system.

Figure 2:
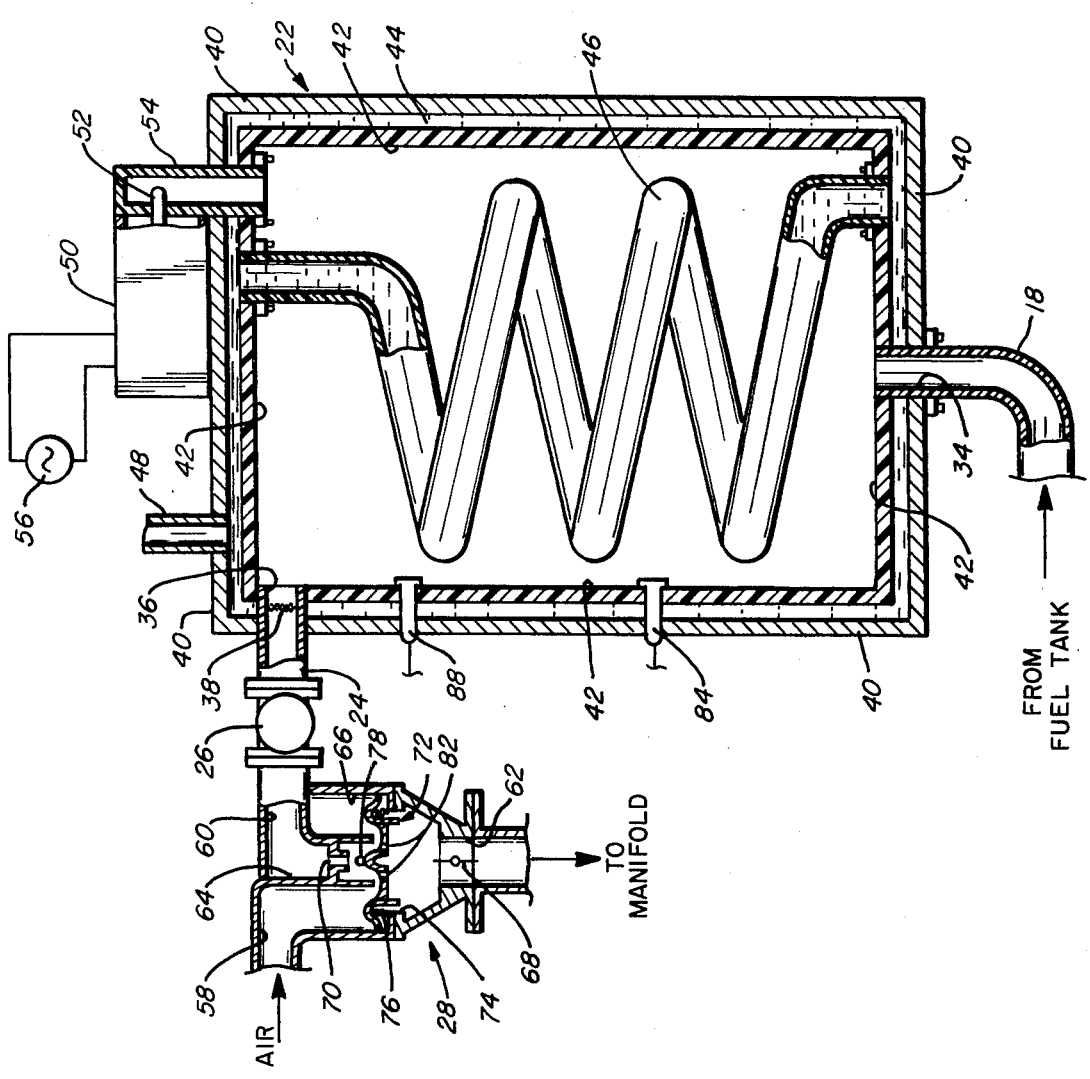
FIG. 2 is an enlarged partly sectional and partly elevational view of the vaporization chamber and mixing chamber of the system of FIG. 1.

Referring now to FIG. 2 in conjunction with FIG. 1, the downstream end of line 18 is received in chamber 22 and forms fuel inlet 34 therefore. Similarly, the upstream end of line 24 is received in the upper end of chamber 22 and forms a vapor outlet 36 having a filter 38 mounted therein.

The chamber 22 itself includes a set of outer chamber walls 40 and a set of inner chamber walls 42 parallel to but spaced from respective ones of the outer walls 40. Thus a space 44 is formed between the inner and outer chamber walls, and this space is filled with a heat transfer liquid to be described more fully below. A coiled tube 46 filled with the same liquid extends through the interior of chamber 22 and has its ends in communication with the space 44. A tubular pressure relief chamber 48 is provided in one of the outer chamber walls 40 for accommodating expansion of the heat transfer liquid. The outer chamber walls 40 may be encased in and insulated by a heat shielding material such as a suitable ceramic.

A magnetron 50, capable of generating microwaves, is mounted on the chamber 22 and has its output 52 exposed to the interior of the chamber 22 by a wave guide tube 54. Magnetron 50 is operably, eletrically connected to a suitable power source 56 conveniently driven by the engine 10 in a manner similar to the driving of a conventional alternator.

The mixing chamber 28 includes an air inlet 58 through which air can enter the chamber 28 via a conventional filtering system. Chamber 28 further includes a vapor inlet 60 communicating with the downstream end of line 24. The vapor inlet 60 leads into a central vapor compartment 64, while the air inlet 58 leads to an annular air compartment 66 surrounding the vapor compartment 64. Both compartments are open at the bottom as shown. The chamber 28 further includes an outlet 62 leading to the manifold 14. The throttle valve 68 is mounted in the outlet 62.

An annular valve seat 70 is formed within the vapor compartment 64. A valve element 72 is mounted in the chamber 28 between the valve seat 70 and the chamber outlet 62. Movement of the valve element 72 toward the outlet 62 is limited by an internal annular flange 74 in chamber 28. Springs 76 interposed between flange 74 and the valve element 72 serve to bias the valve element 72 toward the valve seat 70. A concavity is formed near the outer extremity of the valve element 72 for receipt of the springs 76. A central closure portion 78 of the valve element 72 projects toward the valve seat 70 for engagement therewith to block the flow of vapor from the compartment 64 toward the outlet 62. The annular lower edge of the wall dividing compartments 64 and 66 forms a second seat which engages an intermediate portion of the valve element 72 when the latter is in its upper position to block flow of air out of compartment 66. In between the central portion 78 of valve element 72 and the portion which is engaged by the walls between compartments 74 and 66 are a number of bores 82 through which gasoline and air may flow toward the outlet 62 when the valve element 72 is urged downwardly against the bias of springs 76.

The operation of the system is as follows. As the starter is engaged, a suction will be created by the pistons in cylinders 12 to urge valve element 72 downwardly into its open position and draw air into inlet 58 of chamber 28. The air will be drawn through compartment 66, ports 82 and outlet 62 into the intake manifold 14. Simultaneously, fuel pump 32 will deliver gasoline from tank 16 into the manifold 14. The air and gasoline will be mixed in manifold 14 and the mixture drawn into the cylinders 12 to fire the engine. Air and gasoline will continue to flow in this manner during initial running of the engine. The suction created by the pistons in cylinders 12 as stated causes the valve element 72 to unseat so that there is an open path for flow of gasoline vapor from line 24 through the mixing chamber 28.

With the engine running, the alternator 56 will begin to operate the magnetron 50. The microwaves thus generated and emitted from output 52 will enter the vaporization chamber 22 through wave guide tube 54. The outer chamber walls 40 are formed of a microwave reflecting material such as a suitable metal, while the inner chamber walls 42 and the walls of tube 46 are formed of a microwave transparent material such as polypropylene, polyethylene, etc. The liquid heat transfer medium between walls 40 and 42 and within tubes 46 is a substance capable of absorbing microwaves. Furthermore, this liquid, which generally is polar in nature, has a high boiling temperature relative to the gasoline to be vaporized. Non-limiting examples of such liquids are triethylene glycol, tetraethylene glycol, other high-boiling alcohols, etc. It will be understood that numerous other similar high boiling, low vapor pressure liquids can be used.

The microwaves enterring the chamber will thus be reflected back and forth therein from the walls 40 and will be absorbed by and begin to heat the liquid heat transfer medium. This in turn will heat the inner walls 42 and the tube 46 which thereby serve to define heat transfer surfaces exposed to the interior of chamber 22 to heat and vaporize the gasoline within the chamber. A liquid level sensor 84 is mounted in the walls of chamber 22 and exposed to the interior thereof. Sensor 84 is electrically connected to fuel pump 20 via suitable circuitry 86. Thus during initial operation, sensor 84 will activate the pump 20 if the gasoline level in chamber 22 is too low so that sufficient gasoline will be present in the chamber to permit the desired vapor pressure to build up without undue heating. On the other hand, sensor 84 may also deactivate the pump 20 when the liquid gasoline reaches a sufficient level to prevent the chamber 22 from filling with liquid.

A pressure sensor 88 is also mounted in the walls of chamber 22 and exposed to the interior thereof. Sensor 88 is connected via circuitry 86 to fuel pump 20 as well as to pump 32 and liquid level sensor 84. As the gasoline is heated and vaporized as described above, the pressure within chamber 22 will increase. When this pressure reaches a given value, sensor 88 will operate through circuitry 86 to activate pump 20, de-activate sensor 84, and de-activate pump 32. Vapor flowing through outlet 36 of the vaporization chamber 22, through line 24 and into compartment 64 of the mixing chamber 28 will now be the sole source of fuel to the cylinders 12. Regulator 26 in line 24 controls the pressure of the vapor exiting chamber 22. The vapor is mixed with air in the chamber 28 and the mixture passed through outlet 62 and manifold 14 to the cylinders 12.

It will be noted that the operation of the sensors 84 and 88 will keep gasoline flowing through the chamber 22 and continuously absorbing heat from the liquid heat transfer medium at a temperature sufficient to vaporize the gasoline but not the liquid transfer medium. Thus the latter will not vaporize and thereby cause any significant pressure problems.

It can thus be seen that, due to the pre-vaporization of the gasoline in chamber 22, the fuel supplied to cylinders 12 during ordinary running of the engine comprises, at most, negligible amounts of liquid. Thus more complete combustion of this fuel is achieved with the consequent high efficiency and low pullutant output. Furthermore, since microwave energy is an extremely rapid means of heating, the initial period during which the less efficient auxiliary fuel supply system 32, 30 is operating is minimized. Because such total and rapid vaporization is achieved, straight run or raw gasoline can be used without additives thereby further reducing the pollutant output. Finally, the pre-vaporization system produces virtually no pollutant waste products of its own.

While the invention has been described above as incorporated into one exemplary preferred embodiment, many modifications are contemplated within the spirit of the invention. For example, in the embodiment described, the vapor transfer means for transmitting vapor from the prevaporization chamber to the engine is a modified carburetion system including the mixing chamber 28. However, the invention may be applied to engines having more conventional carburetion systems as well as to those having fuel injection systems. Likewise, while the above embodiment pertains to a gasoline engine, the invention is equally applicable to other types of internal combustion engines such as diesel engines. Still other modifications might include changes in the heat transfer medium itself as well as the means for physically placing such means in heat communication relation to the interior of the pre-vaporization chamber. For example, in some instances, a solid porous heat transfer medium might be employed. In other modifications, the fuel might be placed in direct contact with a liquid heat transfer medium in a common compartment, i.e. bubbled through the heat transfer liquid. However, in such systems, it would be even more important to choose an extremely high boiling heat transfer liquid in order to prevent contamination of the fuel thereby. Still other modifications will suggest themselves to those skilled in the art. Accordingly, it is intended that the scope of the invention be limited only by the claims which follow.

I claim:

1. Fuel pre-vaporization apparatus for an internal combustion engine comprising:
   a fuel vaporization chamber having a fuel inlet and a vapor outlet;
   means for generating microwaves;
   microwave absorbing heat transfer means exposed to said microwave generating means and associated with said vaporization chamber in heat communication relation with the interior of said chamber, said apparatus being adapted to prevent passage of at least a portion of said heat transfer means to said engine; and
   vapor transfer means communicatively connected to said vapor outlet of said vaporization chamber for transmitting vapor from said vaporization chamber to said engine.

2. The apparatus of claim 1 wherein said heat transfer medium comprises a fluid heat transfer medium contained within microwave transparent walls, said walls forming heat transfer surfaces within said vaporization chamber, and wherein said microwave generating means is communicatively connected to said vaporization chamber.

3. The apparatus of claim 2 wherein said chamber is defined by spaced apart inner and outer chamber walls, said inner chamber walls being microwave transparent, and at least a portion of said heat transfer medium being contained between said inner and outer chamber walls.

4. The apparatus of claim 2 including microwave transparent conduit means extending through said vaporization chamber, at least a portion of said heat transfer medium being disposed within said conduit means.

5. The apparatus of claim 4 wherein said conduit means comprises a conduit coil within said vaporization chamber.

6. The apparatus of claim 3 further including microwave transparent conduit means extending through said vaporization chamber, at least a portion of said heat transfer medium being disposed within said conduit means.

7. The apparatus of claim 6 wherein the interior of said conduit means communicates with the space between said chamber walls.

8. The apparatus of claim 2 wherein said heat transfer medium comprises a liquid of high vaporization temperature relative to said fuel.

9. The apparatus of claim 8 wherein said heat transfer medium comprises triethylene glycol.

10. The apparatus of claim 1 further comprising fuel reservoir means communicating with said vaporization chamber and first pump means operatively connected to said vaporization chamber to propel fuel from said reservoir through said vaporization chamber to said vapor transfer means.

11. The apparatus of claim 10 further comprising auxiliary fuel supply means connecting said reservoir to said engine and bypassing said vaporization chamber, and second pump means operatively connected to said auxiliary fuel supply means to propel fuel from said reservoir through said auxiliary fuel supply means.

12. The apparatus of claim 11 further comprising pressure sensing means exposed to the interior of said vaporization chamber and operatively associated with said pump means to activate said first pump means and de-activate said second pump means responsive to vapor pressure in said vaporization chamber in excess of a given value.

13. The apparatus of claim 1 wherein said vapor transfer means includes a mixing chamber having a vapor inlet communicatively connected to the vapor outlet of said vaporization chamber, a gas inlet for admitting a combustion supporting gas, and an outlet communicatively connected to said engine.

14. The apparatus of claim 1 further comprising a power source driven by said engine and operatively connected to said microwave generating means.

* * * * *